United States Patent
Han et al.

(10) Patent No.: US 12,119,475 B2
(45) Date of Patent: Oct. 15, 2024

(54) PROCESS FOR MAKING AN AT LEAST PARTIALLY COATED ELECTRODE ACTIVE MATERIAL

(71) Applicant: BASF SE, Ludwigshafen (DE)

(72) Inventors: Zhenji Han, Amagasaki (JP); Junji Kashiwagi, Yamaguchi (JP); Suhao Wei, Hyogo (JP); Jumpei Nakayama, Yamaguchi (JP); Daisuke Morita, Yamaguchi (JP); Martin Schulz-Dobrick, Heidelberg (DE)

(73) Assignee: BASF SE, Ludwigshafen Am Rhein (DE)

(*) Notice: Subject to any disclaimer, the term of this patent is extended or adjusted under 35 U.S.C. 154(b) by 488 days.

(21) Appl. No.: 17/250,955

(22) PCT Filed: Sep. 20, 2019

(86) PCT No.: PCT/EP2019/075354
§ 371 (c)(1),
(2) Date: Apr. 1, 2021

(87) PCT Pub. No.: WO2020/069886
PCT Pub. Date: Apr. 9, 2020

(65) Prior Publication Data
US 2021/0367222 A1 Nov. 25, 2021

(30) Foreign Application Priority Data

Oct. 2, 2018 (EP) .................................... 18198187
Mar. 20, 2019 (EP) .................................... 19164029

(51) Int. Cl.
| | | |
|---|---|---|
| H01M 4/1391 | (2010.01) | |
| H01M 4/04 | (2006.01) | |
| H01M 4/131 | (2010.01) | |
| H01M 4/36 | (2006.01) | |
| H01M 4/505 | (2010.01) | |
| H01M 4/525 | (2010.01) | |
| H01M 4/62 | (2006.01) | |
| H01M 10/0525 | (2010.01) | |

(52) U.S. Cl.
CPC ....... H01M 4/0402 (2013.01); H01M 4/1391 (2013.01); H01M 4/366 (2013.01); H01M 4/505 (2013.01); H01M 4/525 (2013.01); H01M 4/623 (2013.01); H01M 10/0525 (2013.01); *H01M 4/0416* (2013.01); *H01M 4/0471* (2013.01); *H01M 4/131* (2013.01)

(58) Field of Classification Search
CPC .... H01M 4/1391; H01M 4/366; H01M 4/505; H01M 4/525; H01M 4/0416; H01M 4/0471; H01M 4/131
See application file for complete search history.

(56) References Cited

U.S. PATENT DOCUMENTS

| | | | |
|---|---|---|---|
| 8,993,051 B2 | 3/2015 | Kelder et al. | |
| 2002/0071991 A1 | 6/2002 | Kweon et al. | |
| 2010/0310940 A1* | 12/2010 | Kim ..................... | H01M 4/366 |
| | | | 429/231.95 |
| 2011/0318651 A1 | 12/2011 | Leitner et al. | |
| 2013/0236788 A1* | 9/2013 | Tsunozaki .............. | C01G 51/50 |
| | | | 427/126.3 |
| 2015/0372300 A1 | 12/2015 | Imaizumi et al. | |
| 2017/0040593 A1 | 2/2017 | Miyagi et al. | |
| 2017/0170480 A1 | 6/2017 | Jang et al. | |
| 2018/0069236 A1* | 3/2018 | Yuge ..................... | C01F 17/229 |
| 2018/0212237 A1* | 7/2018 | Lee ................... | H01M 10/0525 |
| 2018/0323436 A1* | 11/2018 | Chen .................... | H01M 4/624 |

FOREIGN PATENT DOCUMENTS

| | | | |
|---|---|---|---|
| CN | 106848191 A | 6/2017 | |
| CN | 107732199 A | 2/2018 | |
| EP | 3399575 A1 | 11/2018 | |
| JP | H08-250120 A | 9/1996 | |
| JP | 2006036545 A * | 2/2006 | ............. C01G 45/00 |
| JP | 4789066 B2 | 10/2011 | |
| JP | 5139024 B2 | 2/2013 | |
| WO | WO-2011/016334 A1 | 2/2011 | |
| WO | WO-2011/081422 A2 | 7/2011 | |
| WO | WO-2018/094819 A1 | 5/2018 | |

(Continued)

OTHER PUBLICATIONS

EPO machine generated English translation of WO2011081422A9 (Year: 2011).*
EPO machine generated English translation of JP-2006036545-A (Year: 2006).*
European Search Report for EP Patent Application No. 18198187.9, Issued on Mar. 28, 2019, 3 pages.
European Search Report for EP Patent Application No. 19164029.1, Issued on Oct. 9, 2019, 3 pages.
International Search Report dated Jan. 8, 2020 for International Application No. PCT/EP2019/075354.
Kweon H-J et al., "Surface Modification of LISR0.002N10.9CO0.1O2 Overcoating With a Magnesium Oxide", Electrochemical and Solid-State Letters, IEEE Service Center, vol. 3, No. 3, (Mar. 1, 2000), pp. 128-130.

*Primary Examiner* — Christopher P Domone
*Assistant Examiner* — Kimberly Wyluda
(74) *Attorney, Agent, or Firm* — Armstrong Teasdale LLP

(57) ABSTRACT

Process for making an at least partially coated electrode active material wherein said process comprises the following steps: (a) Providing an electrode active material according to general formula $Li_{1-x}TM_{1-x}O_2$, wherein TM is Ni and, optionally, at least one of Co and Mn, and, optionally, at least one element selected from Al, Mg, Ba and B, transition metals other than Ni, Co, and Mn, and x is in the range of from zero to 0.2, wherein at least 50 mole-% of the transition metal of TM is Ni, (b) treating said electrode active material with an aqueous formulation containing a compound of Me wherein Me is selected from Sb, Mg, Zn, Sn, and Te, (c) separating off the water, (d) treating the residue thermally.

13 Claims, No Drawings

(56) References Cited

FOREIGN PATENT DOCUMENTS

| WO | WO-2018/123817 A1 | 7/2018 |
|---|---|---|
| WO | 2019/002116 A1 | 1/2019 |
| WO | WO-2020/069882 A1 | 4/2020 |

* cited by examiner

PROCESS FOR MAKING AN AT LEAST PARTIALLY COATED ELECTRODE ACTIVE MATERIAL

This application is a national stage filing under 35 U.S.C. § 371 of International Application No. PCT/EP2019/075354, filed on Sep. 20, 2019, which claims priority to European Patent Application No. 18198187.9, filed on Oct. 2, 2018, and European Patent Application No. 19164029.1, filed on Mar. 20, 2019; the contents of each application is incorporated herein by reference in its entirety.

The present invention is directed towards a process for making an at least partially coated electrode active material wherein said process comprises the following steps:

(a) Providing an electrode active material according to general formula $Li_{1+x}TM_{1-x}O_2$, wherein TM comprises Ni and, optionally, at least one transition metal selected from Co and Mn, and, optionally, at least one element selected from Al, Mg, Ba and B, transition metals other than Ni, Co, and Mn, and x is in the range of from −0.05 to 0.2, wherein at least 50 mole-% of the transition metal of TM is Ni, (b) treating said electrode active material with an aqueous formulation containing a compound of Me wherein Me is selected from Sb, Mg, Zn, Sn, and Te, (c) separating off the water, (d) thermally treating the residue obtained from step (c).

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories assign undesired reactions to free LiOH or $Li_2CO_3$ on the surface. Attempts have been made to remove such free LiOH or $Li_2CO_3$ by washing the electrode active material with water, see, e.g., JP 4,789,066 B, JP 5,139,024 B, and US2015/0372300. However, in some instances it was observed that the properties of the resultant electrode active materials did not improve.

It was an objective of the present invention to provide a process for making Ni-rich electrode active materials with excellent electrochemical properties. It was also an objective to provide Ni-rich electrode active materials with excellent electrochemical properties.

Accordingly, the process defined at the outset has been found, hereinafter also referred to as "inventive process".

The inventive process comprises the following steps:

(a) Providing an electrode active material according to general formula $Li_{1+x}TM_{1-x}O_2$, wherein TM comprises Ni and, optionally, at least one of Co and Mn, and, optionally, at least one element selected from Al, Mg, Ba and B, transition metals other than Ni, Co, and Mn, and x is in the range of from −0.05 to 0.2, wherein at least 50 mole-% of the transition metal of TM is Ni, (b) treating said electrode active material with an aqueous formulation containing a compound of Me wherein Me is selected from antimony, magnesium, zinc, tin, and tellurium, (c) separating off the water, (d) treating the residue thermally.

The inventive process is described in more detail below.

The inventive process comprises four steps, (a), (b), (c) and (d), in the context of the present invention also referred to as step (a) and step (b) and step (c) and step (d), respectively. The commencement of steps (b) and (c) may be simultaneously or preferably subsequently. Steps (b) and (c) may be performed simultaneously or subsequently or, preferably, at least partially overlapping or simultaneously. Step (d) is performed after completion of step (c).

The inventive process starts off from an electrode active material according to general formula $Li_{1+x}TM_{1-x}O_2$, wherein TM comprises Ni and, optionally, at least one transition metal selected from Co and Mn, and, optionally, at least one element selected from Al, Ba, B, and Mg and, wherein at least 50 mole-% of TM is Ni, preferably at least 75 mole-%, and x is in the range of from −0.05 to 0.2. Said material is hereinafter also referred to as starting material.

In one embodiment of the present invention the starting material has an average particle diameter (D50) in the range of from 3 to 20 µm, preferably from 5 to 16 µm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the starting material has a specific surface (BET), hereinafter also referred to as "BET surface", in the range of from 0.1 to 1.0 $m^2/g$. The BET surface may be determined by nitrogen adsorption after outgassing of the sample at 200° C. for 30 minutes or more and beyond this accordance with DIN ISO 9277:2010.

In one embodiment of the present invention, the particulate material provided in step (a) has a moisture content in the range of from 20 to 2,000 ppm, determined by Karl-Fischer titration, preferred are 20 to 1,200 ppm.

In one embodiment of the present invention, the variable TM corresponds to general formula (I a)

$$(Ni_aCo_bMn_c)_{1-d}M^1_d \quad \text{(I a)}$$

with a+b+c=1 and a being in the range of from 0.75 to 0.95, preferably from 0.85 to 0.95, b being in the range of from 0.025 to 0.2, preferably from 0.025 to 0.1, c being in the range of from 0.025 to 0.2, preferably 0.05 to 0.1, d being in the range of from zero to 0.1, preferably from zero to 0.04, $M^1$ is at least one of Al, Mg, W, Mo, Ti or Zr, preferably at least one of Al, Ti and W.

In one embodiment of the present invention, the variable c is zero, $M^1$ is Al and d is in the range of from 0.01 to 0.05.

In another embodiment of the present invention, the variable TM corresponds to general formula (I b)

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

The variable x is in the range of from −0.05 to 0.2.

In one embodiment of the present invention TM corresponds to general formula (I a) and x is in the range from zero to 0.2, preferably from zero to 0.1 and even more preferably 0.01 to 0.05.

In one embodiment of the present invention, TM is selected from $Ni_{0.6}Co_{0.2}Mn_{0.2}$, $Ni_{0.7}Co_{0.2}Mn_{0.1}$, $Ni_{0.8}Co_{0.1}Mn_{0.1}$, $Ni_{0.89}Co_{0.055}Al_{0.055}$, $Ni_{0.9}Co_{0.045}Al_{0.045}$ and $Ni_{0.85}Co_{0.1}Mn_{0.05}$.

In one embodiment of the present invention TM corresponds to general formula (I b) and x is in the range of from −0.05 to zero.

The electrode active material provided in step (a) is usually free from conductive carbon, that means that the conductive carbon content of starting material is less than 1% by weight, referring to said starting material, preferably 0.001 to 1.0% by weight.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material.

In step (b), said particulate material is treated with an aqueous formulation containing a compound of a Me wherein Me is selected from antimony, magnesium, zinc, tin, and tellurium, hereinafter also referred to as "compound of Me" or as "Me compound". Said aqueous formulation may have a pH value in the range of from 2 up to 14, preferably at least 3.5, more preferably from 5 to 11.

In one embodiment of the present invention, the pH value of the aqueous formulation used in step (b) is controlled by the addition of a basic Li compound, especially of LiOH.

The pH value is measured at the beginning of step (b). Depending on the order of addition of electrode active material, water and compound of Me it is observed that in the course of step (b), the pH value may raise to at least 10, for example 11 to 13. In embodiments wherein the pH value is in the range of from 10 to 11 at the beginning of step (b) it raises to more than 11 to up to 13. In embodiments wherein the pH value is in the range of 3 to below 10 at the beginning of step (b) it raises to 11 to up to 13.

It is preferred that the water hardness of said aqueous formulation used in step (b) is at least partially removed, especially calcium. The use of desalinized water is preferred.

Out of compounds of Me, inorganic compounds of Me are preferred.

Of inorganic compounds of antimony, magnesium, zinc, tin, and tellurium, water-soluble halides such as chlorides are possible but oxides, hydroxides, sulfates, and lithiated oxides are preferred.

Examples of compounds of antimony are compounds of Sb(+III) and of Sb(+V). Examples of compounds of Sb(+III) are $Sb(OH)_3$, $Sb_2O_3 \cdot aq$, $Sb_2(SO_4)_3$, SbOOH, $LiSbO_2$, and $Sb_2O_3$. Examples of compounds of Sb(+V) are $Sb_2O_5$, $LiSb_3O_8$, $LiSbO_3$, $Li_3SbO_4$, $Li_5SbO_5$, $Li_7SbO_6$, $Sb_2O_4$ (Sb(III)Sb(V)$O_4$), and oxyhydroxides of Sb(+V) such as, but not limited to $SbO(OH)_3$, $Sb_2O_4(OH)_2$, $Sb_2O_3(OH)_4$, $Sb_3O_6OH$, $Sb_3O_7OH$.

Examples of compounds of magnesium are MgO, $MgO \cdot aq$, $MgSO_4$, $Mg(OH)_2$, magnesium oxyhydroxides such as $Mg_2O(OH)_2$ and $Mg(NO_3)_2$.

Examples of compounds of zinc are ZnO, $ZnO \cdot aq$, $Li_2ZnO_2$, $Li_4ZnO_3$, $Li_{10}Zn_4O_9$, $ZnSO_4$, $Zn(OH)_2$, $Li_{0.086}Zn_{0.914}O_{0.957}$, and $Zn(NO_3)_2$.

Examples of compounds of tin are SnO, $SnO_2$, $SnO_2 \cdot aq$, oxyhydroxides of Sn(+IV) such as $SnO(OH)_2$, $Sn_3O_4$, $Sn_2O_3$, $Li_2SnO_3$, $Li_8SnO_6$, and $Li_{1.8}SnO_3$.

Examples of compounds of Te are $TeO_2$, $TeO_3$, and $Li_2TeO_3$.

In one embodiment of the present invention, said water-insoluble compound of Me has an average particle diameter (D50) in the range of from 200 nm to 10 μm, preferably 2 to 5 μm, dispersed in water and determined by scanning electron microscopy (SEM).

In one embodiment of the present invention, step (b) is performed by slurrying the particulate material from step (a) in an aqueous formulation containing a compound of Me followed by removal of the water by a solid-liquid separation method and drying at a maximum temperature in the range of from 50 to 450° C.

In one embodiment of the present invention, step (b) is performed by slurrying the particulate material from step (a) in water followed addition of a compound of Me, in bulk or as solution or as slurry, followed by removal of the water by a solid-liquid separation method and drying at a maximum temperature in the range of from 50 to 450° C.

In one embodiment of step (b), the aqueous medium used in step (b) may additionally contain ammonia or at least one transition metal salt, for example a nickel salt or a cobalt salt. Such transition metal salts preferably bear counterions that are not detrimental to an electrode active material. Sulfate and nitrate are feasible. Chloride is not preferred.

In one embodiment of step (b), the aqueous medium used in step (b) additionally contains 0.001 to 10% by weight of an oxide or hydroxide or oxyhydroxide of Li, Al, Mo, W, Ti, Ni, or Zr. In another embodiment of step (b), the aqueous medium used in step (b) contain does not contain measurable amounts of any of oxides or hydroxides or oxyhydroxides of Li, Al, Mo, W, Ti, Ni, or Zr.

In one embodiment of the present invention, step (b) is performed at a temperature in the range of from 5 to 85° C., preferred are 10 to 60° C.

In one embodiment of the present invention, step (b) is performed at normal pressure. It is preferred, though, to perform step (b) under elevated pressure, for example at 10 mbar to 10 bar above normal pressure, or with suction, for example 50 to 250 mbar below normal pressure, preferably 100 to 200 mbar below normal pressure.

Step (b) may be performed, for example, in a vessel that can be easily discharged, for example due to its location above a filter device. Such vessel may be charged with starting material followed by introduction of aqueous medium. In another embodiment, such vessel is charged with aqueous medium followed by introduction of starting material. In another embodiment, starting material and aqueous medium are introduced simultaneously.

In one embodiment of the present invention, the volume ratio of electrode active material and total aqueous medium in step (b) is in the range of from 3:1 to 1:5, preferably from 2:1 to 1:2.

Step (b) may be supported by mixing operations, for example shaking or in particular by stirring or shearing, see below.

In one embodiment of the present invention, the molar amount of residual lithium of the electrode active material provided in step (a) exceeds the molar amount of compound of Me from step (b), for example by a factor of 1.01 to 3.0, preferably 1.1 to 2.0. It is, e.g., in the range of such preferred embodiment to apply compound of Me in a factor of 1.1 to 2.0 per mole of residual lithium in the electrode active material provided in step (a). It is, e.g., also in the range of such preferred embodiment to apply compound of Me in a factor of 1.01 to 1.0 per mole of residual lithium in the electrode active material provided in step (a).

In one embodiment of the present invention, step (b) has a duration in the range of from 1 minute to 30 minutes, preferably 1 minute to less than 5 minutes. A duration of 5 minutes or more is possible in embodiments wherein in step (b), water treatment and water removal are performed overlapping or simultaneously.

Without wishing to be bound by any theory, we believe that in embodiments wherein electrode active material provided in step (a) is treated with an aqueous solution of a compound of Me, for example a sulfate of Me, oxide or hydroxide of Me is precipitated on the surface of electrode active material provided in step (a) due to the raise of the pH value.

In one embodiment of the present invention, treatment according to step (b) and water removal according to step (c) are performed consecutively.

After or during the treatment with an aqueous medium in accordance to step (b), water may be removed by any type of filtration, for example on a band filter or in a filter press.

In one embodiment of the present invention, at the latest 3 minutes after commencement of step (b), step (c) is started. Step (c) includes separating off the water from treated particulate material, for example by way of a solid-liquid separation, for example by decanting or preferably by filtration. Said "separating off" may also be referred to as removal.

In one embodiment of step (c), the slurry obtained in step (b) is discharged directly into a centrifuge, for example a decanter centrifuge or a filter centrifuge, or on a filter device, for example a suction filter or in a belt filter that is located preferably directly below the vessel in which step (b) is performed. Then, filtration is commenced.

In a particularly preferred embodiment of the present invention, steps (b) and (c) are performed in a filter device with stirrer, for example a pressure filter with stirrer or a suction filter with stirrer. At most 3 minutes after—or even immediately after—having combined starting material and aqueous medium in accordance with step (b), removal of aqueous medium is commenced by starting the filtration. On laboratory scale, steps (b) and (c) may be performed on a Büchner funnel, and steps (b) and (c) may be supported by manual stirring.

In a preferred embodiment, step (b) is performed in a filter device, for example a stirred filter device that allows stirring of the slurry in the filter or of the filter cake.

In one embodiment of the present invention, the water removal in accordance to step (c) has a duration in the range of from 1 minute to 1 hour.

In one embodiment of the present invention, stirring in step (b)—and (c), if applicable—is performed with a rate in the range of from 1 to 50 rounds per minute ("rpm"), preferred are 5 to 20 rpm.

In one embodiment of the present invention, filter media may be selected from ceramics, sintered glass, sintered metals, organic polymer films, non-wovens, and fabrics.

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (b) and (c) under an atmosphere with a carbon dioxide content below detection limit for example with infrared-light based optical methods.

Subsequently, the water-treated material obtained after step (c) is dried, for example at a temperature in the range of from 40 to 250° C. at a normal pressure or reduced pressure, for example 1 to 500 mbar. If drying under a lower temperature such as 40 to 100° C. is desired a strongly reduced pressure such as from 1 to 20 mbar is preferred.

In one embodiment of the present invention, said drying is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (d) under an atmosphere with a carbon dioxide content below detection limit for example with infrared-light based optical methods.

In one embodiment of the present invention said drying has a duration in the range of from 1 to 10 hours, preferably 90 minutes to 6 hours.

In one embodiment of the present invention, the lithium content of an electrode active material is reduced by 1 to 5% by weight, preferably 2 to 4% is reduced by performing steps (b) and (c). Said reduction mainly affects the so-called residual lithium.

In a preferred embodiment of the present invention, the material obtained from step (c) has a residual moisture content in the range of from 50 to 1,200 ppm, preferably from 50 to 400 ppm. The residual moisture content may be determined by Karl-Fischer titration.

In one embodiment of the present invention, the material provided in accordance with step (a) is first treated with water, then the majority of water is removed by a solid-liquid method, for example by filtration.

The inventive process includes a subsequent step (d):

(d) thermally treating the residue obtained from step (c).

Step (d) may be carried out in any type of oven, for example a roller hearth kiln, a pusher kiln, a rotary kiln, a pendulum kiln, or—for lab scale trials—in a muffle oven.

The temperature of the thermal treatment according to step (d) may be in the range of from 300 to 900° C., preferably 300 to 700° C. and even more preferably from 550 to 650° C.

The temperature of 350 to 700° C. corresponds to the maximum temperature of step (d).

It is possible to subject the material obtained from step (c) directly to step (d). However, it is preferred to increase the temperature stepwise, or to ramp up the temperature, or to dry the material obtained after step (c) at first at a temperature in the range of from 40 to 80° C. before subjecting it to step (d). Said step-wise increase or ramping up may be performed under normal pressure or reduced pressure, for example 1 to 500 mbar.

Step (d)—at its maximum temperature—may be performed under normal pressure.

In one embodiment of the present invention, step (d) is carried out under an oxygen-containing atmosphere, for example air, oxygen-enriched air or pure oxygen.

In one embodiment of the present invention the thermal treatment according to step (d) is in the range of from 100 to 250° C. with a duration of from 10 minutes to 5 hours.

In one embodiment of the present invention, the residue obtained from step (d) is first treated at a temperature in the range of from 100 to 250° C. with a duration of from 10 minutes to 5 hours and then treated at a temperature in the range of from 300 to 900° C., preferably 300 to 700° C. and even more preferably from 550 to 650° C.

In one embodiment of the present invention, step (d) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (d) under an atmosphere with a carbon dioxide content below detection limit for example with infrared-light based optical methods.

In one embodiment of the present invention step (d) has a duration in the range of from 1 to 10 hours, preferably 90 minutes to 6 hours.

In one embodiment of the present invention, the lithium content of an electrode active material is reduced by 1 to 5% by weight, preferably 2 to 4%. Said reduction mainly affects the so-called residual lithium.

By carrying out the inventive process, electrode active materials are obtained with excellent electrochemical properties. Without wishing to be bound by any theory, we assume that the extra aluminum may lead to scavenging lithium compounds deposited at the surface of the electrode active material.

Without wishing to be bound by any theory, we assume that the surface of the electrode active material is less negatively influenced by the inventive process than by washing processes without inorganic aluminum compound addition.

A further aspect of the present invention relates to an electrode active material, hereinafter also referred to as inventive electrode active material. Inventive electrode active material is in particulate form has the general formula $Li_{1+x1}TM_{1-x1}O_2$, wherein TM comprises Ni and, optionally, at least one transition metal selected from Co and Mn, and, optionally, at least one element selected from Al, Mg, Ba and B, transition metals other than Ni, Co, and Mn, and x is in the range of from −0.05 to 0.15, wherein at least 50 mole-% of the transition metal of TM is Ni, wherein the outer surface of said particles is at least partially coated with an oxide of Me and lithiated oxide of Me wherein Me is selected from Sb, Mg, Zn, Sn, and Te.

In a preferred embodiment of the present invention, Me is Sb.

In one embodiment of the present invention, lithiated oxides of Me such as $LiSbO_2$ or $Li_2TeO_3$ are amorphous.

In one embodiment of the present invention, the outer surface of said particles is uniformly coated with a combination of an oxide of antimony and a lithium oxide species of antimony, and wherein the coating is uniform as detected by EDX mapping ("energy dispersive X-ray mapping).

Such coating may be non-uniform, for example in an island structure. This means that there are non-coated parts of electrode active material that do not display any oxide of Me nor any lithiated oxide of Me, and there are "islands" that exhibit such coating, detectable, e.g., by TEM ("Transmission Electron Microscopy") including EDX mapping and electron diffraction. In a preferred embodiment, however, such coating is uniform, which means that the thickness of the coating is about the same on all parts of each particles, and each particle is coated.

In one embodiment of the present invention, the variable TM corresponds to general formula (I a)

$(Ni_aCo_bMn_c)_{1-d}M^1_d$     (I a)

with a+b+c=1 and a being in the range of from 0.75 to 0.95, preferably from 0.85 to 0.95, b being in the range of from 0.025 to 0.2, preferably from 0.025 to 0.1, c being in the range of from 0.025 to 0.2, preferably 0.05 to 0.1, d being in the range of from zero to 0.1, preferably from zero to 0.04, $M^1$ is at least one of Al, Mg, W, Mo, Ti or Zr, preferably at least one of Al, Ti and W.

In one embodiment of the present invention, the variable c is zero, $M^1$ is Al and d is in the range of from 0.01 to 0.05.

In another embodiment of the present invention, the variable TM corresponds to general formula (I b)

$(Ni_{a*}Co_{b*}Al_{e*})_{1-d*}M^2_{d*}$     (I b)

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

The variable x1 is in the range of from −0.05 to 0.15.

In one embodiment of the present invention TM corresponds to general formula (I a) and x is in the range from zero to 0.2, preferably from zero to 0.1 and even more preferably 0.01 to 0.05.

In one embodiment of the present invention TM corresponds to general formula (I b) and x is in the range of from −0.05 to zero.

In one embodiment of the present invention inventive electrode active materials have an average particle diameter (D50) in the range of from 3 to 20 μm, preferably from 5 to 16 μm. The average particle diameter may be determined, e. g., by light scattering or LASER diffraction or electroacoustic spectroscopy. The particles are usually composed of agglomerates from primary particles, and the above particle diameter refers to the secondary particle diameter.

In one embodiment of the present invention inventive electrode active materials have a surface (BET) in the range of from 0.1 to 2.0 m²/g, determined according to DIN-ISO 9277:2003-05.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight $M_w$ in the range from 50,000 to 1,000,000 g/mol, preferably to 500,000 g/mol.

Binder may be cross-linked or non-cross-linked (co)polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

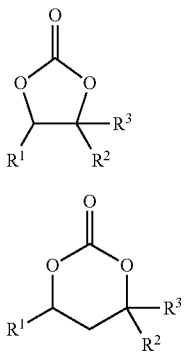

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

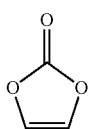

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

General remarks: N-methyl-2-pyrrolidone: NMP.

I. Synthesis of a Cathode Active Material

I.1 Synthesis of a Precursor TM-OH.1

A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained Ni, Co and Mn at a molar ratio of 8.5:1.0:0.5 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) oxyhydroxide precursor was obtained by filtration of the resulting suspension, washing with distilled water, drying at 120° C. in air and sieving.

I.2 Conversion of TM-OH.1 into a Cathode Active Materials

I.2.1 Manufacture of a Comparative Cathode Active Material, C-CAM.1, Step (a.1)

C-CAM.1 (Comparative): The mixed transition metal oxyhydroxide precursor obtained according to I.1 was mixed with $Al_2O_3$ (average particle diameter 6 nm) to obtain a concentration of 0.3 mole-% Al relative to Ni+Co+Mn+Al and LiOH monohydrate to obtain a Li/(TM+Al) molar ratio of 1.06. The mixture was heated to 760° C. and kept for 10 hours in a forced flow of a mixture of 60% oxygen and 40% nitrogen (by volume). After cooling to ambient temperature the powder was deagglomerated and sieved through a 32 µm mesh to obtain the electrode active material C-CAM 1.

D50=9.0 µm determined using the technique of laser diffraction in a Mastersize 3000 instrument from Malvern Instruments. The Al-content was determined by ICP analytics and corresponded to 780 ppm. Residual moisture at 250° C. was determined to be 300 ppm.

II. Treatment of Cathode Active Materials with Aqueous Formulation Containing a Compound of Antimony, and Comparison Experiments Ultra-Dry Air: Moisture-Free and $CO_2$-Free Air II.1 Treatment with an aqueous slurry of $Sb_2O_3$ Step (b.1): An amount of 0.91 g of $Sb_2O_3$ was slurried in 67 ml of de-ionized water. A suspension of $Sb_2O_3$ with a pH value of 6 was obtained to which 100 g C-CAM.1 were added. The molar ratio of $Sb_{slurry}/(TM+Sb)$ was 0.006. The resultant slurry was stirred at ambient temperature over a period of 5 minutes.

Step (c.1): Then, the water was removed by filtration through a filter press.

Step (d.1): The resultant filter cake was dried in ultra-dry air at 70° C. for 2 hours and then at 120° C. over a period of 10 hours.

Then, by sieving obtained powder with 45 µm sieve, inventive cathode active material CAM.1 was obtained.

II.2 Treatment with an Aqueous Solution of $Sb_2(SO_4)_3$

Step (b.2): An amount of 1.65 g of $Sb_2(SO_4)_3$ was dissolved in 67 ml of de-ionized water. The pH value of the solution was adjusted to 9 by adding LiOH. A suspension of freshly precipitated hydroxide or oxyhydroxide of Sb was obtained to which 100 g C-CAM.1 were added. The molar ratio of $Sb_{slurry}/(TM+Sb)$ was 0.006. The resultant slurry was stirred at ambient temperature over a period of 5 minutes.

Step (c.2): Then, the water was removed by filtration through a filter press.

Step (d.2): The resultant filter cake was dried in ultra-dry air at 70° C. for 2 hours and then at 120° C. over a period of 10 hours.

Then, by sieving obtained powder with 45 µm sieve, inventive cathode active material CAM.2 was obtained. By EDX mapping, it can be shown that the surface of CAM.2 is uniformly covered with Sb oxide and a lithium oxide species of Sb.

II.3 Comparison Experiment: Me-Free Treatment

Step C-(b.3): An amount of 100 g C-CAM.1 was slurried in 67 ml of de-ionized water. The resultant slurry was stirred at ambient temperature over a period of 5 minutes.

Step C-(c.3): Then, the water was removed by filtration through a filter press.

Step C-(d.3): The resultant filter cake was dried in ultra-dry air at 70° C. for 2 hours and then at 120° C. over a period of 10 hours.

Then, by sieving obtained powder with 45 µm sieve, comparative cathode active material C-CAM.3 was obtained.

II.4 Comparison Experiment: Treatment with $B_2O_3$

Step C-(b.4): An amount of 0.22 g of $B_2O_3$ was slurried in 67 ml of de-ionized water. A slurry of $B_2O_3$ was obtained to which 100 g C-CAM.1 were added. The molar ratio of $B_{slurry}/(TM+B)$ was 0.006. The resultant slurry was stirred at ambient temperature over a period of 5 minutes.

Step C-(c.4): Then, the water was removed by filtration through a filter press.

Step C-(d.4): The resultant filter cake was dried in ultra-dry air at 70° C. for 2 hours and then at 120° C. over a period of 10 hours.

Then, by sieving obtained powder with 45 µm sieve, comparative cathode active material C-CAM.4 was obtained.

II.5 Treatment with an Aqueous Slurry of Sb Compound

Step (b.5): An amount of 1.65 g of $Sb_2(SO_4)_3$ was dissolved in 67 ml of de-ionized water. The pH value of the solution was adjusted to 9 by adding LiOH. A suspension of freshly precipitated hydroxide or oxyhydroxide of Sb was obtained to which 100 g C-CAM.1 were added. The molar ratio of $Sb_{slurry}/(TM+Sb)$ was 0.006. The resultant slurry was stirred at ambient temperature over a period of 5 minutes.

Step (c.5): Then, the water was removed by filtration through a filter press.

Step (d.5): The resultant filter cake was dried in ultra-dry air at 70° C. for 2 hours and then at 120° C. over a period of 10 hours, followed by a thermal treatment at 650° C. for 1 hour in an atmosphere of oxygen.

Then, by sieving obtained powder with 45 µm sieve, inventive cathode active material CAM.5 was obtained.

II.6 Treatment with an Aqueous Slurry of Sn Compounds

Step (b.6): An amount of 1.34 g of $SnSO_4$ was dissolved in 67 ml of de-ionized water. The pH value of the solution was adjusted to 7 by adding LiOH. A suspension of freshly precipitated hydroxide or oxyhydroxide of Sn(+II) was obtained to which 100 g C-CAM.1 were added. The molar ratio of $Sn_{slurry}/(TM+Sn)$ was 0.006. The resultant slurry was stirred at ambient temperature over a period of 5 minutes.

Step (c.6): Then, the water was removed by filtration through a filter press

Step (d.6): The resultant filter cake was dried in ultra-dry air at 70° C. for 2 hours and then at 120° C. over a period of 10 hours followed by a thermal treatment at 650° C. for one hour in an atmosphere of oxygen.

Then, by sieving obtained powder with 45 µm sieve, inventive cathode active material CAM.6 was obtained.

II.7 Treatment with an Aqueous Solution of $ZnSO_4$

Step (b.7): An amount of 1.00 g of $ZnSO_4$ was dissolved in 67 ml of de-ionized water. A solution with a pH value of 6.5 was obtained to which 100 g C-CAM.1 were added. The molar ratio of $Zn_{solution}/(TM+Zn)$ was 0.006. The resultant slurry was stirred at ambient temperature over a period of 5 minutes.

Step (c.7): Then, the water was removed by filtration through a filter press

Step (d.7): The resultant filter cake was dried in ultra-dry air at 70° C. for 2 hours and then at 120° C. over a period of 10 hours followed by a thermal treatment at 650° C. for one hour in an atmosphere of oxygen.

Then, by sieving obtained powder with 45 µm sieve, inventive cathode active material CAM.7 was obtained.

II.8 Treatment with an Aqueous Solution of $MgSO_4$

Step (b.8): An amount of 0.74 g of $MgSO_4$ was dissolved in 67 ml of de-ionized water. A solution with a pH value of 8 was obtained to which 100 g C-CAM.1 were added. The molar ratio of $Mg_{solution}/(TM+Mg)$ was 0.006. The resultant slurry was stirred at ambient temperature over a period of 5 minutes.

Step (c.8): Then, the water was removed by filtration through a filter press

Step (d.8): The resultant filter cake was dried in ultra-dry air at 70° C. for 2 hours and then at 120° C. over a period of 10 hours followed by a thermal treatment at 650° C. for one hour in an atmosphere of oxygen.

Then, by sieving obtained powder with 45 μm sieve, inventive cathode active material CAM.8 was obtained.

II.9 Treatment with an Aqueous Slurry of $Sb_2O_3$

Steps (b.1) and (b.2) were performed as above.

Step (d.9): The resultant filter cake was dried in ultra-dry air at 70° C. for 2 hours and then at 120° C. over a period of 10 hours followed by a thermal treatment at 700° C. for one hour in an atmosphere of oxygen.

Then, by sieving obtained powder with 45 μm sieve, inventive cathode active material CAM.9 was obtained.

II.10 Treatment with an Aqueous Slurry of $SnO_2$

Step (b.10): An amount of 0.84 g of $SnO_2$ was slurried in 67 ml of de-ionized water. A suspension of $SnO_2$ with a pH value of 6 was obtained to which 100 g C-CAM.1 were added. The molar ratio of $Sn_{slurry}/(TM+Sn)$ was 0.006. The resultant slurry was stirred at ambient temperature over a period of 5 minutes.

Step (c.10): Then, the water was removed by filtration through a filter press.

Step (d.10): The resultant filter cake was dried in ultra-dry air at 70° C. for 2 hours and then at 120° C. over a period of 10 hours followed by a thermal treatment at 700° C. for one hour in an atmosphere of oxygen.

Then, by sieving obtained powder with 45 μm sieve, inventive cathode active material CAM.10 was obtained.

II.11 Treatment with an Aqueous Slurry of ZnO

Step (b.11): An amount of 0.51 g of ZnO was slurried in 67 ml of de-ionized water. A suspension of ZnO with a pH value of 8 was obtained to which 100 g C-CAM.1 were added. The molar ratio of $Zn_{slurry}/(TM+Zn)$ was 0.006. The resultant slurry was stirred at ambient temperature over a period of 5 minutes.

Step (c.11): Then, the water was removed by filtration through a filter press.

Step (d.11): The resultant filter cake was dried in ultra-dry air at 70° C. for 2 hours and then at 120° C. over a period of 10 hours followed by a thermal treatment at 700° C. for one hour in an atmosphere of oxygen.

Then, by sieving obtained powder with 45 μm sieve, inventive cathode active material CAM.11 was obtained.

II.12 Treatment with an Aqueous Slurry of MgO

Step (b.12): An amount of 0.25 g of MgO was slurried in 67 ml of de-ionized water. A suspension of MgO with a pH value of 10 was obtained to which 100 g C-CAM.1 were added. The molar ratio of $Mg_{slurry}/(TM+Mg)$ was 0.006. The resultant slurry was stirred at ambient temperature over a period of 5 minutes.

Step (c.12): Then, the water was removed by filtration through a filter press.

Step (d.12): The resultant filter cake was dried in ultra-dry air at 70° C. for 2 hours and then at 120° C. over a period of 10 hours followed by a thermal treatment at 700° C. for one hour in an atmosphere of oxygen.

Then, by sieving obtained powder with 45 μm sieve, inventive cathode active material CAM.12 was obtained.

II.13 Treatment with an Aqueous Slurry of $Sb_2O_3$

Steps (b.1) and (b.2) were performed as above.

Step (d.9): The resultant filter cake was dried in ultra-dry air at 70° C. for 2 hours and then at 120° C. over a period of 10 hours followed by a thermal treatment at 300° C. for 2 hours in an atmosphere of oxygen.

Then, by sieving obtained powder with 45 μm sieve, inventive cathode active material CAM.13 was obtained.

II.14 Treatment with an Aqueous Slurry of $Sb_2O_3$

Step (b.1): An amount of 1.36 g of $Sb_2O_3$ was slurried in 67 ml of de-ionized water. A suspension of $Sb_2O_3$ with a pH value of 6 was obtained to which 100 g C-CAM.1 were added. The molar ratio of $Sb_{slurry}/(TM+Sb)$ was 0.009. The resultant slurry was stirred at ambient temperature over a period of 5 minutes.

Step (c.1): Then, the water was removed by filtration through a filter press.

Step (d.1): The resultant filter cake was dried in ultra-dry air at 70° C. for 2 hours and then at 120° C. over a period of 10 hours.

Then, by sieving obtained powder with 45 μm sieve, inventive cathode active material CAM.14 was obtained.

III. Testing of Cathode Active Material

III.1 Electrode Manufacture, General Procedure

Positive electrode: PVDF binder (Solef® 5130) was dissolved in NMP (Merck) to produce a 8 wt. % solution. For electrode preparation, binder solution (3 wt. %), and carbon black (Li250, 3.5 wt.-%) were suspended in NMP. After mixing using a planetary centrifugal mixer (ARE-250, Thinky Corp.; Japan), either any of inventive CAM.1 to CAM.7 or a comparative cathode active material (92.5 wt. %) was added and the suspension was mixed again to obtain a lump-free slurry. The solid content of the slurry was adjusted to 85%. The slurry was coated onto Al foil using a KTF-S roll-to-roll coater (Mathis AG). Prior to use, all electrodes were calendared. The thickness of cathode material was 70 μm, corresponding to 15 mg/cm². All electrodes were dried at 105° C. for 7 hours before battery assembly.

III.2 Electrolyte Manufacture

A base electrolyte composition was prepared containing 12.7 wt % of $LiPF_6$, 26.2 wt % of ethylene carbonate (EC), and 61.1 wt % of ethyl methyl carbonate (EMC) (EL base 1), based on the total weight of EL base 1. To this base electrolyte formulation 2 wt. % of vinylene carbonate (VC) was added (EL base 2).

III.3 Test Cell Manufacture: Coin-Type Half Cells

Coin-type half cells (20 mm in diameter and 3.2 mm in thickness) comprising a cathode prepared as described under III.1.1 and lithium metal as working and counter electrode, respectively, were assembled and sealed in an Ar-filled glove box. In addition, the cathode and anode and a separator were superposed in order of cathode//separator//Li foil to produce a half coin cell. Thereafter, 0.15 mL of the EL base 1 which is described above (III.2) were introduced into the coin cell.

IV. Evaluation of Cell Performance

Evaluation of Coin Half-Cell Performance

Cell performance were evaluated using the produced coin type battery. For the battery performances, initial capacity and reaction resistance of cell were measured.

The initial performance and cycle were measured as follows:

Coin half cells according to III.3.1 were tested in a voltage range between 4.3 V to 2.8 V at room temperature. For the initial cycles, the initial lithiation was conducted in the CC-CV mode, i.e., a constant current (CC) of 0.1 C was applied until reaching 0.01 C. After 10 min resting time, reductive lithiation was carried out at constant current of 0.1 C up to 2.8 V. For the cycling, the current density is 0.1 C. The results are summarized in Table 1.

The cell reaction resistance was calculated by the following method.

The coin cells after the evaluation of the initial performance is recharged to 4.3V, and the resistance is measured by the AC impedance method using potentiostat and frequency response analyzer system (Solartron CellTest System 1470E). From the EIS spectra can be divided into Ohmic resistance and relative resistance. The results are summarized in Table 1. [%] relative resistance is based on the resistance of cell based on C-CAM.3 as 100%.

TABLE 1

Initial charge and discharge capacity with initial reaction resistance, coin cell

| CAM | Me | 1st Charge capacity [mA·h/g] | 1st Discharge capacity [mA·h/g] | Coulombic efficiency [%] | R (impedance) [Ω] | Relative R (impedance) [%] |
|---|---|---|---|---|---|---|
| CAM.1 | Sb | 230 | 211 | 98.9 | 27.5 | 39 |
| CAM.2 | Sb | 230 | 212 | 98.3 | 8.7 | 12 |
| C-CAM.3 | — | 232 | 209 | 90.0 | 70.9 | 100 |
| CAM.5 | Sb | 230 | 212 | 92.0 | 8.7 | 12 |
| CAM.6 | Sn | 234 | 216 | 92.5 | 8.3 | 12 |
| CAM.7 | Zn | 232 | 209 | 90.2 | 9.8 | 14 |
| CAM.8 | Mg | 233 | 210 | 90.0 | 14.0 | 20 |
| CAM.9 | Sb | 230 | 211 | 91.7 | 7.8 | 11 |
| CAM.10 | Sn | 232 | 208 | 89.6 | 9.8 | 14 |
| CAM.11 | Zn | 232 | 205 | 88.4 | 9.5 | 13 |
| CAM.12 | Mg | 234 | 214 | 91.4 | 8.0 | 11 |
| CAM.13 | Sb | 233 | 212 | 91.0 | 25.7 | 36 |
| CAM.14 | Sb | 229 | 209 | 91.5 | 28.3 | 40 |

The invention claimed is:

1. A process for making an at least partially coated electrode active material comprising the steps of:
   (a) providing an electrode active material according to general formula $Li_{1+x}TM_{1-x}O_2$, wherein TM is a combination of metals according to general formula (I a)

   $(Ni_aCo_bMn_c)_{1-d}M_d$        (I a)

with
   a ranging from 0.60 to 0.99;
   b ranging from 0.01 to 0.20;
   c ranging from zero to 0.20; and
   d ranging from zero to 0.10;
   M is at least one of Al, Mg, Ti, Nb, Mo, W, and Zr; and $a+b+c=1$;

and x ranges from zero to 0.20;
   or wherein TM corresponds to the general formula (I b)

   $(Ni_{a^*}Co_{b^*}Al_{e^*})_{1-d^*}M^2_{d^*}$        (I b)

with
   a* ranging from 0.75 to 0.95;
   b* ranging from 0.025 to 0.2;
   e* ranging from 0.01 to 0.2; and
   d* ranging from zero to 0.1;
   $M^2$ is at least one of W, Mo, Ti and Zr; and $a^*+b^*+e^*=1$;

and x ranges from −0.05 to 0.2;
   (b) treating the electrode active material from step (a) with an aqueous formulation comprising a compound of Me wherein Me is chosen from Sb, Mg, Zn, Sn, and Te, wherein the compound of Me has an average particle diameter (D50) in a range of 200 nm to 10 μm dispersed in water;
   (c) separating off water from the aqueous formulation to form a residue; and
   (d) treating the residue thermally under an oxygen-containing atmosphere.

2. The process according to claim 1, wherein step (c) is performed by filtration or with the help of a centrifuge.

3. The process according to claim 1, wherein M is Al.

4. The process according to claim 1, wherein the compound of Me in step (b) is chosen from inorganic compounds of antimony.

5. The process according to claim 1, wherein the compound of Me in step (b) is chosen from $Sb_2O_3$ dispersed and $Sb_2O_3$ slurried in water.

6. The process according to claim 1, wherein in step (b), a compound of Me is precipitated on a surface of the electrode active material provided in step (a).

7. The process according to claim 1, wherein step (d) includes a calcination step at a maximum temperature ranging from 300° C. to 700° C.

8. The process according to claim 1 wherein step (d) includes a drying step at a maximum temperature ranging from 40° C. to 250° C.

9. The process according to claim 1, wherein TM is chosen from $Ni_{0.6}Co_{0.2}Mn_{0.2}$, $Ni_{0.7}Co_{0.2}Mn_{0.1}$, $Ni_{0.8}Co_{0.1}Mn_{0.1}$, $Ni_{0.89}Co_{0.055}Al_{0.055}$, $Ni_{0.9}Co_{0.045}Al_{0.045}$, and $Ni_{0.85}Co_{0.1}Mn_{0.05}$.

10. The process according to claim 1, wherein in step (b), the amounts of aqueous formulation and electrode active material have a weight ratio ranging from 2:1 to 1:2.

11. The process according to claim 1, wherein the aqueous formulation is in the form of a dispersion or slurry.

12. The process according to claim 1, wherein the oxygen-containing atmosphere is air, oxygen-enriched air, or pure oxygen.

13. The process according to claim 1, wherein the compound of Me has an average particle diameter (D50) in a range of 2 μm to 5 μm dispersed in water.

\* \* \* \* \*